United States Patent
Baccarani

(10) Patent No.: US 9,853,867 B2
(45) Date of Patent: Dec. 26, 2017

(54) METHOD AND APPARATUS TO DETERMINE NETWORK QUALITY

(71) Applicant: EMPIRIX INC., Billerica, MA (US)

(72) Inventor: Angelo Baccarani, Modena (IT)

(73) Assignee: EMPIRIX, INC., Billerica, MA (US)

( * ) Notice: Subject to any disclaimer, the term of this patent is extended or adjusted under 35 U.S.C. 154(b) by 217 days.

(21) Appl. No.: 14/716,220

(22) Filed: May 19, 2015

(65) Prior Publication Data

US 2016/0344606 A1 Nov. 24, 2016

(51) Int. Cl.
*H04L 12/24* (2006.01)
*H04W 24/10* (2009.01)
*H04W 24/04* (2009.01)

(52) U.S. Cl.
CPC ...... *H04L 41/5003* (2013.01); *H04L 41/5038* (2013.01); *H04L 41/5067* (2013.01); *H04W 24/04* (2013.01); *H04W 24/10* (2013.01)

(58) Field of Classification Search
CPC .. H04W 24/10; H04W 24/04; H04L 41/5067; H04L 41/5038; H04L 41/5003
See application file for complete search history.

(56) References Cited

U.S. PATENT DOCUMENTS

| | | |
|---|---|---|
| 2006/0159017 A1 | 7/2006 | Mun et al. |
| 2013/0219048 A1 | 8/2013 | Arvidsson et al. |
| 2014/0229210 A1 | 8/2014 | Sharifian et al. |
| 2014/0337871 A1* | 11/2014 | Garcia De Blas ................ H04N 21/64738 725/14 |
| 2015/0098352 A1 | 4/2015 | Froehlich |

FOREIGN PATENT DOCUMENTS

| | | | | |
|---|---|---|---|---|
| FI | WO 2014166523 A1 * | 10/2014 | ......... | H04L 41/5067 |
| WO | WO-2014/166523 A1 | 10/2014 | | |

OTHER PUBLICATIONS

Apdex Alliance, available at http://apdex.org, last accessed May 19, 2015.
International Search Report in PCT International Application No. PCT/US2016/033316, dated Aug. 8, 2016.
Written Opinion of the International Searching Authority in PCT International Application No. PCT/US2016/033316, dated Aug. 8, 2016.

* cited by examiner

*Primary Examiner* — Jianye Wu
(74) *Attorney, Agent, or Firm* — Venable LLP

(57) ABSTRACT

Aspects of the invention may involve systems and methods. A system may score the experience of accessed services. The system may include a probe connected to a telecommunications network and configured to transmit metrics at regular intervals. The system may also include a network monitor configured to: receive data from the probe, transform the received data into key performance indicators, generate a set of key quality indicators based on the key performance indicators, categorize one or more subscribers, and calculate a Quality of Experience index based on the categorized subscribers.

16 Claims, 7 Drawing Sheets

$$\text{QOE-Index} = \frac{\text{Satisfied} + (\text{Tolerating} / 2)}{\text{Total Samples}}$$

METHOD AND APPARATUS TO DETERMINE NETWORK QUALITY

FIELD OF INVENTION

The present invention relates to network performance and more specifically to determining telecommunication network quality.

SUMMARY

Aspects of the invention may involve systems and methods. In one embodiment of the invention, a system may exist to score the experience of accessed services comprising: a probe, the probe connected to a telecommunications network, the probe configured to transmit metrics at regular intervals; and a network monitor comprising one or more processors, the network monitor configured to: receive data from the probe, transform the received data into key performance indicators, generate a set of key quality indicators based on the key performance indicators, categorize one or more subscribers as one of: satisfied, tolerating, or frustrated based on the key quality indicators, and calculate a Quality of Experience index based on the categorized subscribers, wherein the Quality of Experience Index is then aggregated by at least one of subscribers, devices, locations, or applications, wherein when a poor Quality of Experience index is calculated, automatically indicating a possible root cause of a problem and identifying if the poor quality of experience is due to issues in a user device, in an access network, in a core network or in a content provider server.

In another embodiment of the invention, a method may exist to score the experience of accessed services, the method comprising: receiving, by a network monitor, data from one or more network probes, the one or more probes located on a telecommunications network; transforming, by the network monitor, the data received from the network probes into key performance indicators; generating, by the network monitor, a set of key quality indicators based on the key performance indicators; categorizing, by the network monitor, one or more subscribers as one of: satisfied, tolerating, or frustrated based on the key quality indicators; and calculating a quality of experience for each of the categorized subscribers, aggregated by at least one of subscribers, devices, locations, or applications, wherein when a poor quality of experience is calculated, automatically indicating a possible root cause of a problem and identifying if the poor quality of experience is due to issues in a user device, in an access network, in a core network or in a content provider server.

BRIEF DESCRIPTION OF THE DRAWINGS

The foregoing and other features and advantages of the invention will be apparent from the following, more particular description of various embodiments, as illustrated in the accompanying drawings wherein like reference numbers generally indicate identical, functionally similar, and/or structurally similar elements. The first digits in the reference number indicate the drawing in which an element first appears.

DESCRIPTION OF THE EMBODIMENTS

Figure 1:
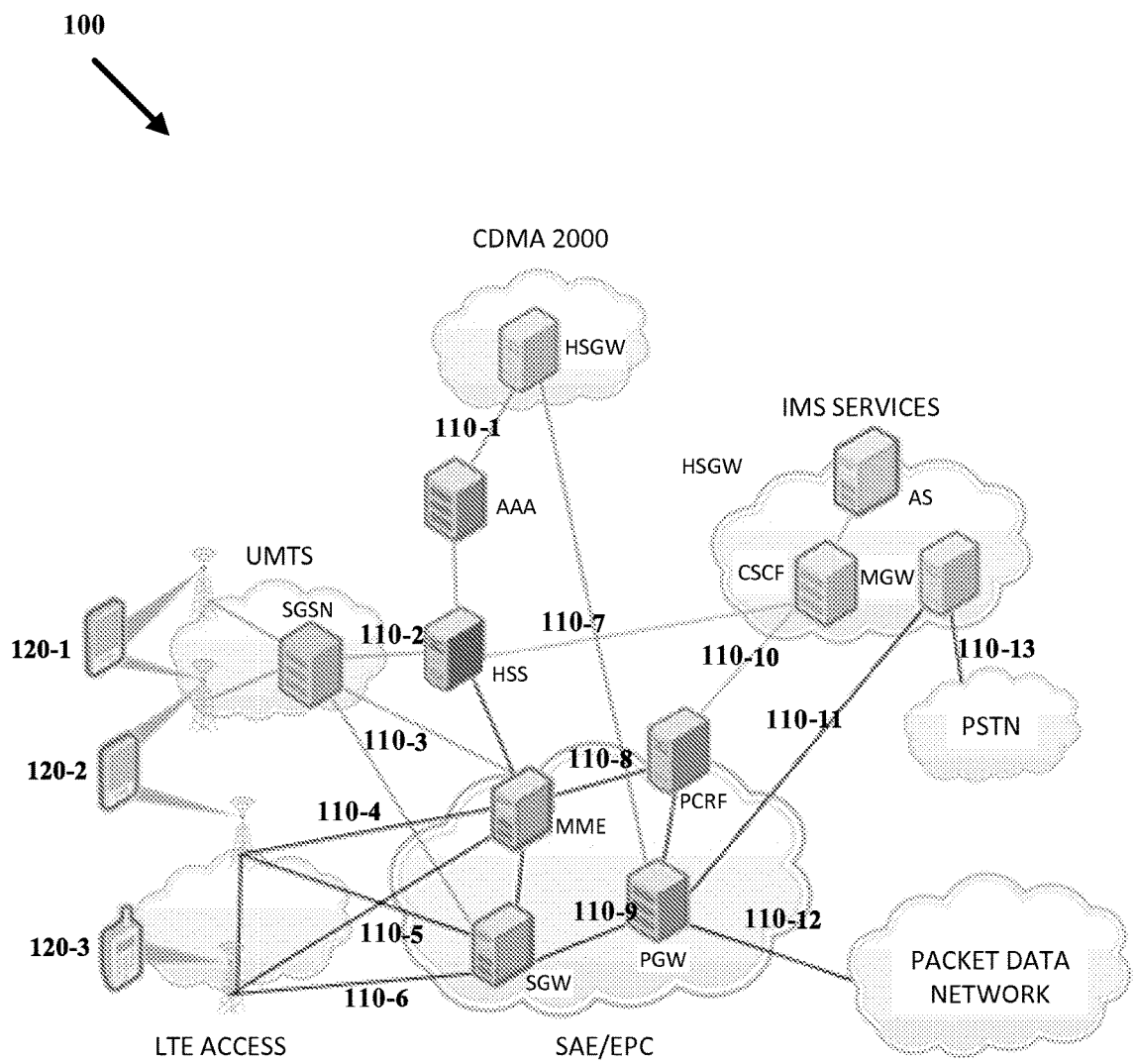
FIG. 1 depicts an example telecommunication network.

Illustrative embodiments are discussed in detail below. While specific embodiments are discussed, it should be understood that this is done for illustration purposes only. In describing and illustrating the embodiments, specific terminology is employed for the sake of clarity. However, the embodiments are not intended to be limited to the specific terminology so selected. A person skilled in the relevant art will recognize that other components and configurations may be used without departing from the spirit and scope of the embodiments. It is to be understood that each specific element includes all technical equivalents that operate in a similar manner to accomplish a similar purpose. The examples and embodiments described herein are non-limiting examples.

As used herein, the term "a" refers to one or more. The terms "including," "for example," "such as," "e.g.," "may be" and the like, are meant to include, but not be limited to, the listed examples. The term "product" may refer to both products and services.

Some embodiments of the invention may provide or utilize some or all the following components:

Wireless device may be a term used to describe a mobile device used to make a telephone call or access data using a wireless telecommunications network. A wireless device may be, for example, a mobile phone, a smartphone (e.g., Android phone, iPhone, Microsoft Windows phones, Blackberry, etc.), a tablet (e.g., iPad, Surface, Android device, etc.), a computer, a laptop, a camera, a videogame console, or other device that may connect to a wireless telecommunications network.

Global System for Mobile communications (GSM) is an international standard for the interaction of wireless device on a telecommunications network including radio base stations.

Code Division Multiple Access (CDMA2000) is a 3G technology that may be an alternative to GSM and UMTS, for example.

Universal Mobile Telecommunications System (UMTS) is a 3G technology that may be an alternative to CDMA2000, for example.

Long Term Evolution (LTE) is a 4G technology.

WiFi or wireless LAN (WLAN) provides a wireless network for communication of wireless devices that may use, for example, IEEE 802.11 standards.

Public Switched Telephone Network (PSTN) the original telephone switching network based on wire line technology (a VOIP network, for example, may interconnect with a traditional PSTN network).

Voice over IP (VOIP) is a set of technologies used to implement voice or video calls over a packet switched IP (internet) network as opposed to a dedicated PSTN.

A call detail record (CDR) may be an record that is automatically generated on completion of a telephone call or data session (e.g., SMS, Internet access, phone on, phone connect to the network, acquiring new base station, or any normal transactional process associated with the mobility management and usage of the application or call protocol layers). A CDR may be related to call events and/or data sessions.

A transaction detail record (TDR) may be an automatic record generated on the completion of a transaction on the telecommunications network not normally associated with a call (e.g., a SMS, a data session, a phone registering on the network). The TDR may contain at least the same attributes as the CDR. A TDR may contain more transactional data (e.g., registering a phone on a network) than a CDR.

x-Detail Record (xDR) or detail record may be a term used to describe a generic call or transaction detail record and may cover both a CDR and TDR. The detail records may include information and attributes such as telephone numbers of requesting and receiving devices, location of devices, communication paths used (e.g., base station, signal towers), network element, time, GGSN, SGSN, handset, APN, cell technology, radio technology (e.g., 2/3G), roaming type, country, carrier, source number, destination number, destination category, destination nature of address, destination numbering plan, OPC/DPC, release location, routing natr, routing numbering plan, source category, source natr, source numbering plan, teleservice information, transmission media requirement, trunk, quality attribute (e.g., call success), mean opinion score (e.g., the quality voice transmission), The detail records may include a quality indicator of some sort, a success ratio of the transaction (e.g., "did my registration on the network succeed or not"), and/or a scalar value (e.g., "I received 10 Mbit/s throughput on web browsing)." These metrics may be presented in the detail records alongside other attributes such as the cell, network element, application, user identifier, handset identifier, etc.

User equipment (UE) may be a term used to describe a device used to make a call, access data on a telecommunications network, etc. A UE may be a handset, a wireless device, an application, and/or other device that connects to a telecommunications network (e.g. a credit card swiping machine in a store).

Probes (e.g., Telecommunications probes or multi-service probes (MSP)) may generate CDR, TDR, or xDRs and transmit to a landing zone. Probes may analyze data transmitted by UE and other equipment on a network.

Landing zone may be a centralized computer system that may receive xDRs from probes. The landing zone may execute software implementations of various network analysis algorithms.

Core Network may be a central part of a telecommunications network that provides services to subscribers connected by the Access Network.

Access Network may be a part of a telecommunications network that connects subscribers to a service provider.

In telecommunications networks, whether fixed (e.g., land line voice and/or data) or mobile (e.g., voice, sms, and/or data), situations may arise where users may not be able to achieve an intended objective ("quality of experience", QoE) through the combination of UE (e.g., a mobile or fixed line phone, a VOIP handset, or application running on a computer) and the service provided on a network maintained by a telecommunications service operator. Unlike voice services, for example, whose evaluation of QoE is standardized, there is a lack of objective methods applicable to data traffic accessed in mobility.

The solutions available today are based on the concept of installing software agents on subscribers' devices (e.g., UE) and performing measurements about the perceived QoE. However, such approach may have the following drawbacks that limit the scope of their adoption on a large-scale basis. (1) Privacy issues: subscribers normally do not like the concept of having an application installed by the Mobile Operator that will detect and report on every activity carried on Internet. (2) Specific authorization from subscribers to install such applications is mostly required in every country in the world so doubts are about the real acceptance from the whole customer base of such solution. Further, if the acceptance level is low, the obtained results will not have statistic relevancies. (3) Such applications should periodically send data to a central server consuming bandwidth and traffic volumes that the subscribers may be paying for, which is another reason to not install them on own devices.

The activities that may be impaired may include, for example, the ability to initiate or connect a telephone call and/or data session (e.g., congestion on the network); ability to complete a call and/or data session that has already started, (e.g., the call drops due to a radio network issue); ability to initiate a connection with the 2G, 3G, 4G, etc. mobile network; ability to complete a data session that has already started (e.g., the connection to the internet service drops); ability to complete the sending of a text message; ability for a mobile device to register on a roaming network; ability for a mobile device to connect to a mobile network upon switching on of the device, ability for a mobile device to continue to stay in communication with the mobile network as the mobile device moves from one mobile base station (e.g., cell tower) to another. Generally, the classes of activity which may be impaired include making calls, texting, maintaining phone in contact with mobile network, ability to access applications (e.g., web browsing) once a data session is established, and the ability to establish and maintain the session once started.

In one embodiment, the number of users that are experiencing impaired events may be automatically recorded with the distinction that the number of distinct users affected by all problems may be measured all the time. The events may be measured (e.g., observed) from one or more xDRs and recorded along with the number of affected users in a database.

Probes that can decode the telecommunications protocols on the network and can record the events in the form of call or transaction detail records may be placed on the network. Data (e.g., call or transaction detail records) from the probes may be supplied to one or more computing systems.

In one embodiment, a passive monitoring system may be provided to score the Quality of Experience (QoE) of users accessing mobile data services through various protocols (e.g., HTTP), by means of collection and correlation of, for example, multiple parameters available on 3G/4G Control and User Plane interfaces at GGSN/S-GW sites.

A computational model may be provided to passively correlate measurable parameters from live mobile data traffic as detected in the Core Network, and score the overall Quality of Experience (QoE) by means of a single index, for example. The model may provide, for example, automatic identification of possible impairments affecting QoE located in the Access Network or the Core Network, or external to the network being monitored (e.g., remote servers of content providers or Internet).

The computational model may objectively assess the QoE and correlate, for example. (1) Network dependent factors including all the procedures involved in the data access in mobility (therefore not only the specific application/service but also other procedures like network access, authentication, etc.) (2) Users expectation based on their profile ("if I pay more I expect more"). (3) Context of use (Private vs. Business). (4) Application-specific factors.

The obtained QoE metric may be adopted by Mobile Network Operators (MNO) for the following purposes. (1) To drive strategic company decisions. For example, understanding the QoE means to understand how your subscribers are using the network and what experience they may be receiving. This may be important information for the definition of the MNO's strategy. (2) As complementary information for Business and Subscribers Intelligence. Current billing systems allow collection of user information on how a subscriber uses a network, but they lack the experience information to properly evaluate the probability of churn. (3) For Network Planning To focus the investments to improve QoE into the areas where the high paying customers are, and enhance the performances of the applications they use. (4) For Network Supervision and Operations. For example, monitoring the network from the same standpoint as subscribers (e.g., looking to subscriber experience and not only to the performance of the infrastructure).

The QoE should be scored on more than just the application's response time. As described herein, the QoE includes calculations suitable for mobile networks and to provide a root cause identification of the possible reasons of QoE degradation.

FIG. 1 shows an example converged telecommunication network 100 including CDMA (mobile), UMTS (mobile), LTE (4G), and PSTN for use with an illustrative embodiment. Converged telecommunication network 100 depicts connections as lines between communicating devices on the network. Probes 110-1, 110-2, 110-3, 110-4, 110-5, 110-6, 110-7, 110-8, 110-9, 110-10, 110-11, 110-12, and 110-13 may be deployed to intercept communication between network devices (e.g., between the lines shown in network 100) to record any event on the network regardless of technology. The devices on Network 100 may connect as shown in the lines and probes 110-1, 110-2, 110-3, 110-4, 110-5, 110-6, 110-7, 110-8, 110-9, 110-10, 110-11, 110-12, and 110-13 may monitor communication through, devices such as, for example, STPs (signaling transfer point) in SS7, session border controllers in VOIP, SGSN/GGSNs (serving GPRS Service Nodes/Gateway GPRS Service Node) in UMTS and/or PGWs (Packet Gateways) in LTE. User device 120-1, 120-2, and 120-3 (e.g., UE, wireless device, etc.) may provide an end point for communications.

Figure 2:
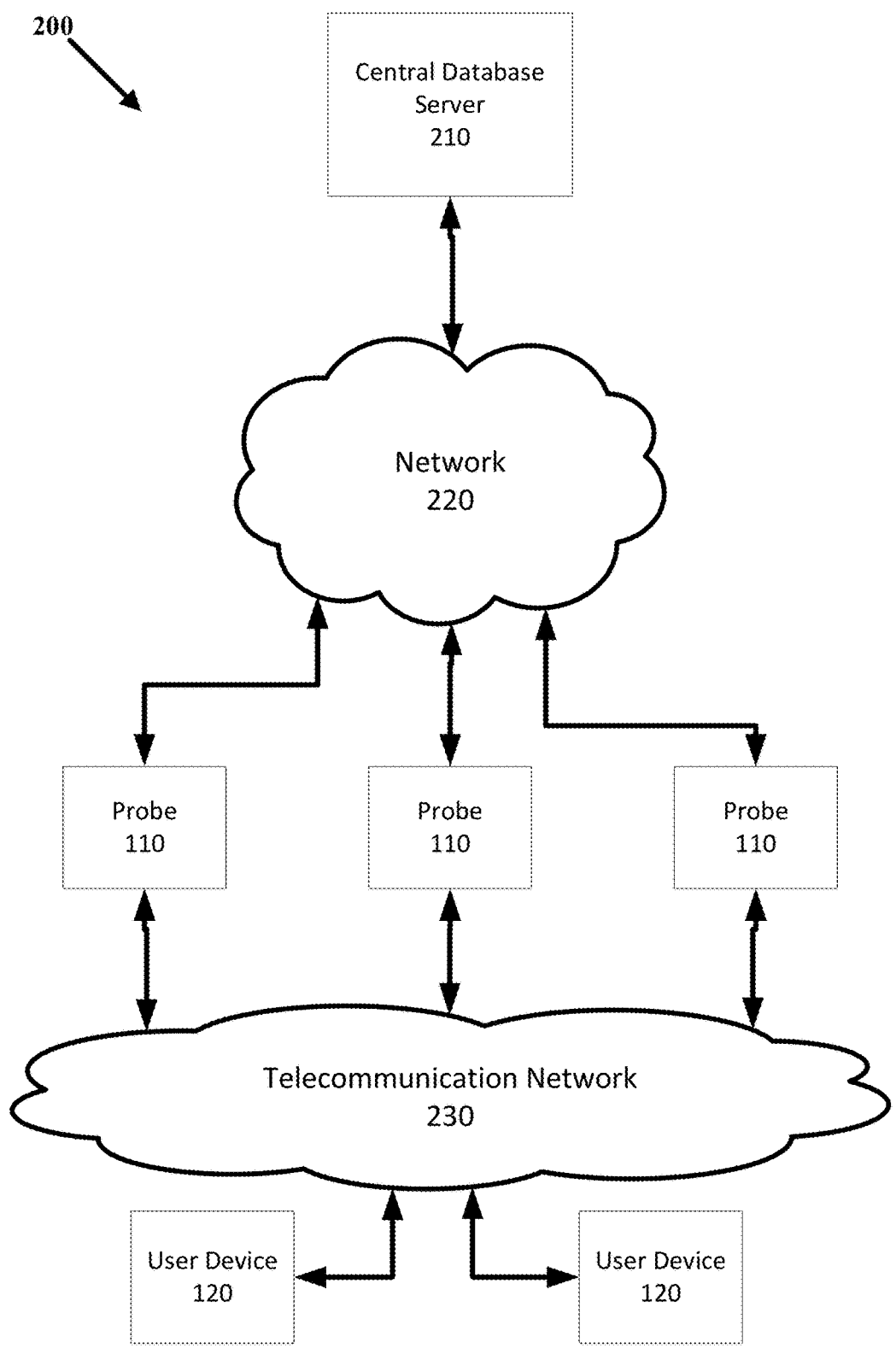
FIG. 2 depicts an example block diagram showing telecommunication probes and a central processing location.

FIG. 2 depicts an example block diagram showing telecommunication probes 110 and a central processing location 210. Block diagram 200 depicts probes110, central database server 210 (e.g., central processing location), network 220, and telecommunications network 230. Network 220 and telecommunications network 230 may be the same network and either network may be a WAN, for example. The central database server 210 may receive and collate multiple xDRs from multiple probes110. The xDRs may be loaded and stored on one or more databases for analysis. The central database server 210 may be one machine or multiple machines and may be dispersed in multiple locations. The central database server 210 may be located, for example, in the cloud. Probes 110 may interface with telecommunication network 230 (e.g., via optical/electric IP interface cards) and record, for example, call, application, and/or transaction detail records. Probes110 may also connect to network 220 and send, for example, call, application, and transaction detail records to the central database server 210. The central database server 210 may receive and store data from one or more probes110 and may calculate user impact. The central database server 210 may continuously or periodically monitor and calculate the current status of the telecommunications network 230. Telecommunications network 230 and network 220 may include both mobile and fixed telecommunications.

Probes 110 may generate call or transaction detail records (CDRs/TDRs). The CDRs or TDRs may be received and analyzed to detect problems on a telecommunications network 230. One or more attributes (e.g., number of failed sessions attribute) of the CDRs/TDRs may be analyzed to determine network problems.

Probes 110 may be, for example, pieces of equipment that connect to a mobile network (e.g., telecommunications network 230) and may examine packets (or other discrete pieces of information) flowing on network 230. Information on the network 230 may be, for example, related to setting up an event on telecommunications network 230 (e.g., the establishment of a telephone call,) or related to transporting the payload of the session (e.g., voice or data) from UE 120 to the network 230. One embodiment of the invention probes all events on the network 230.

Probes 110 may simultaneously monitor voice, video and/or data services in all major mobile and fixed networks. Packets may be captured via interface cards supporting, for example, 10 Gb interfaces with architectural support for at least 40 Gb and 100 Gb bandwidth volumes.

In one example, a network flow may include a user making a 4G call on a mobile device (UE) 120. The call may get handed over to 3G (e.g., the user drops out of 4G coverage cells) and then this call may be handed overseas via the public switched telephone network (e.g., the wireline non VOIP network) to a destination mobile operator and finally to another UE. Each of these hops may be monitored using probes110. There may be many hundreds or even thousands of probes on the network.

xDRs (e.g., CDRs and TDRs) may be produced on an ongoing automatic basis by probes 110. The xDRs may be output to a file system on probes 110 or may be transmitted to another location (e.g., database, email address(es), etc.). Probes110 may include, for example, a computer running, at least, a probing application.

xDRs may vary in format according to which part of the network they are generated on. The part of the network that they are recorded on may be referred to as a 'network interface,' for example.

xDRs may have the following high level fields, for example:

Time, Subscriber Identifier, Event type, Error Code, Dimension1, . . . , DimensionN In the above example, the TDR may contain a time indicator indicating when an event took place.

The subscriber identifier may be a unique identifier for a user of the telecommunications network 230. For example, an international mobile subscriber identity (IMSI) (e.g., printed on your SIM card in the 2/3G network), a telephone number or even an IP address. The subscriber identifier may be a field that uniquely identifies the subscriber.

The event type may identify a type of user initiated and/or network initiated event the xDR records (e.g., a telephone call, a data session, a registration on the network, etc.). The number of different event types may be in the thousands.

The error code may identify where the event type succeeded or not, and if it did not succeed what caused the error. For example, when registering onto a SIP network, if the error code attribute is non-zero, then an error has occurred with the process. There may be many possible errors reported by the network or the device itself. For example, error 404 in internet browsing indicates that the website being accessed by the device is not found. Each protocol examined by probes may have a unique set of error codes covering abnormal possibilities. These error codes may be defined, for example, in the 3GPP specifications for UMTS, and for each protocol there may be an individual set of specifications from standards bodies. Thousands of abnormal error codes may exist.

The error code field may also contain an indicator of a poor scalar variable such as, for example, voice quality, throughput of data, success ratios of aggregated events, etc. The error code should not be a transactional code from the network or from the UE. In the case of scalar measurements, for example, probes 110 may for every call, transaction and/or event in progress, use qualitative and statistical techniques to determine the quality of service. For example, in HTTP, probes 110 may measure the number of bytes downloaded, and the time taken to do this. The quality metric derived here may be throughput which is the number of bytes downloaded divided by the time taken. In another example, probes 110 may monitor the quality for each call in progress using statistical techniques based on the number of packets lost and/or the delays in the network, and use this to create a MOS score that rates call quality (e.g., on a scale between 1 and 5). For error code measurements, these may be returned in the transactions that are received either from the UE or from the network. In the example of congestion, the network may respond to a request to make a call with 'Too much congestion.' Whereas a UE may transmit a similar message to indicate that it was no longer able to complete downloading a segment of data, such as an interrupted web session. In these cases the actual codes may be sent across the network and originate from one of the network elements and/or from the UE Dimension1, . . . , DimensionN may refer to a xDR type having its own list of unique fields that are related to the xDR but may vary from one network interface to another. These may be used as a set of scan dimensions.

In one example, for a wire line SS7 call the xDR may have the following Dimension fields: Originating Point Code, Destination Point Code, and/or Trunk. Originating/Destination Point code may be a unique address of the network elements in the voice network (e.g., similar to IP addresses in an IP network). Trunk may be an identifier of a circuit for voice flowing through the network.

In another example, for a 3G data session the xDR may have the following Dimension fields: Handset Type, Website visited, and/or Cell Identifier. For example, handset type may contain iphone 4s', website visited may contain 'www.facebook.com,' and cell identifier may be the unique numeric identifier given to the connected cell tower by the network.

In the above examples, dimension1 . . . dimension may vary, but a common feature may be that these dimensions may be used in the case/root cause analysis (e.g., the scanning phase) to identify possible causes of an initial spike of bad experiences for a set of subscribers, for example.

xDRs may be transferred automatically to a central location called, for example, a landing zone or central database server 210. Central database server 210 may include a file system, database, or other digital repository on one or more computers or computer systems. At the central location, an application server may house both the landing zone and for example, a Customer Experience Monitor (CEM) application. The CEM application may process xDRs in an automatic fashion as xDRs are received and/or periodically (e.g., every n seconds, where n may be configurable).

Accessing data services in mobility is complex because involving various protocol procedures each of them can affect positively or negatively the overall experience, although many protocol procedures are fully transparent to the subscriber because they are provided in the background by the network nodes to, for example, the user device 120. However, a single indicator (the QoE index) may correlate all the aspects that are visible through passive probing, that is, analyzing the real network traffic without the need of installing any software agent into the user device 120.

Figure 3:
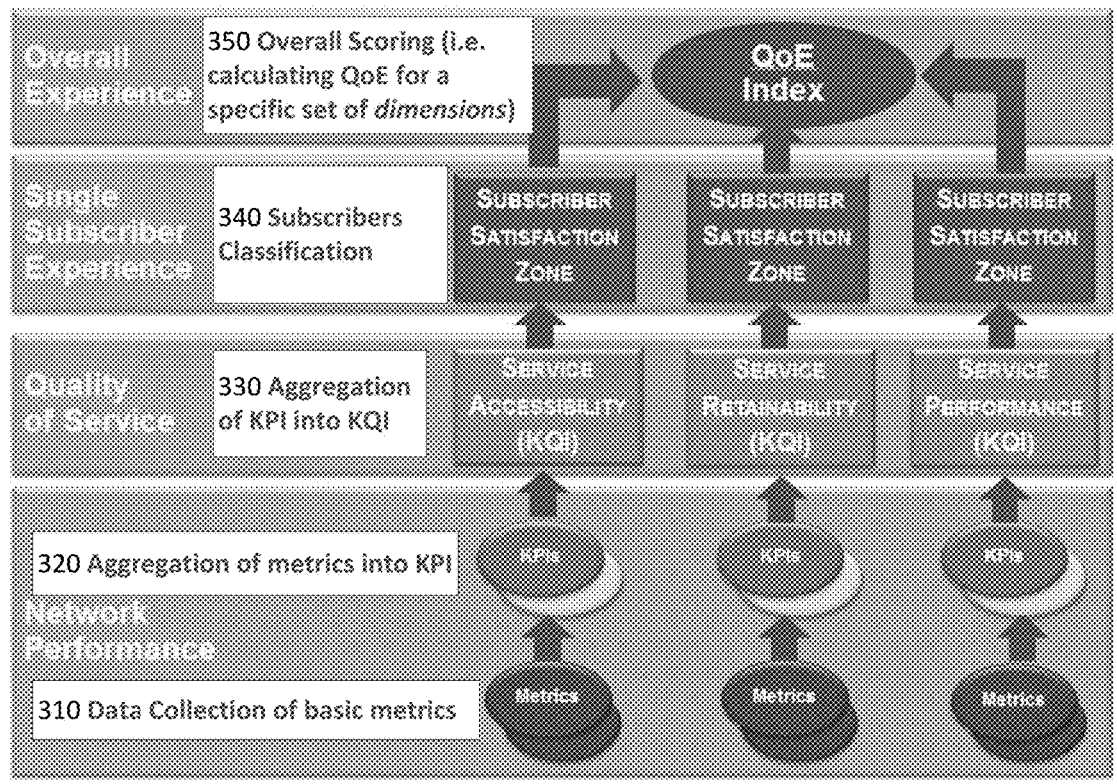
FIG. 3 depicts an example workflow of an embodiment of the invention.

FIG. 3 depicts an example workflow of an embodiment of the invention. In 310, data collection may be occurring. Metrics may be collected by, for example, probes 110. The metrics may be related to all protocol procedures executed between the user device 120 and telecommunications network 230. From 310, flow may move to 320.

In 320, the metrics may be aggregated or transformed into key performance indicators. The key performance indicators may include, for example, a number of attempted calls/sessions, a total number of failed called/sessions due to a network and/or to a user. From 320, flow may move to 330.

In 330, the key performance indicators may be aggregated or transformed into key quality indicators. The key quality indicators may include, for example, a Authentication Success Rate, a DNS Failure Rate, a Session Cut-Off Ratio and, in general, any KQI defined by International Standards or internally by the Mobile Network Operator as part of its strategy to measure the QoE. From 330, flow may move to 340.

In 340, correlating the key performance indicators, the activity of each subscriber may be categorized. The categories may include, for example, the following three groups. (1) Satisfied: where response times are fast enough to satisfy the user who is therefore able to concentrate fully on the work at hand, with minimal negative impact on his/her thought process. (2) Tolerating: response times are longer than those of the satisfied zone so the user notices how long it takes to interact with the system. However, the response times are not high enough to, by themselves, threaten the usability of the application. (3) Frustrating: user becomes unhappy. Casual user is likely to abandon a course of action while a "production" user may cancel the task. From 340, flow may move to 350.

In 350, the Quality of Experience Index may be derived based on correlating the samples in the categories from 340. Depending on the required purpose, such index may be reported by relevant dimensions such as single subscriber, groups of subscribers, mobile devices, applications, services, and/or network location. Accordingly, a QoE may be calculated for a specific set of dimensions.

Figure 4:
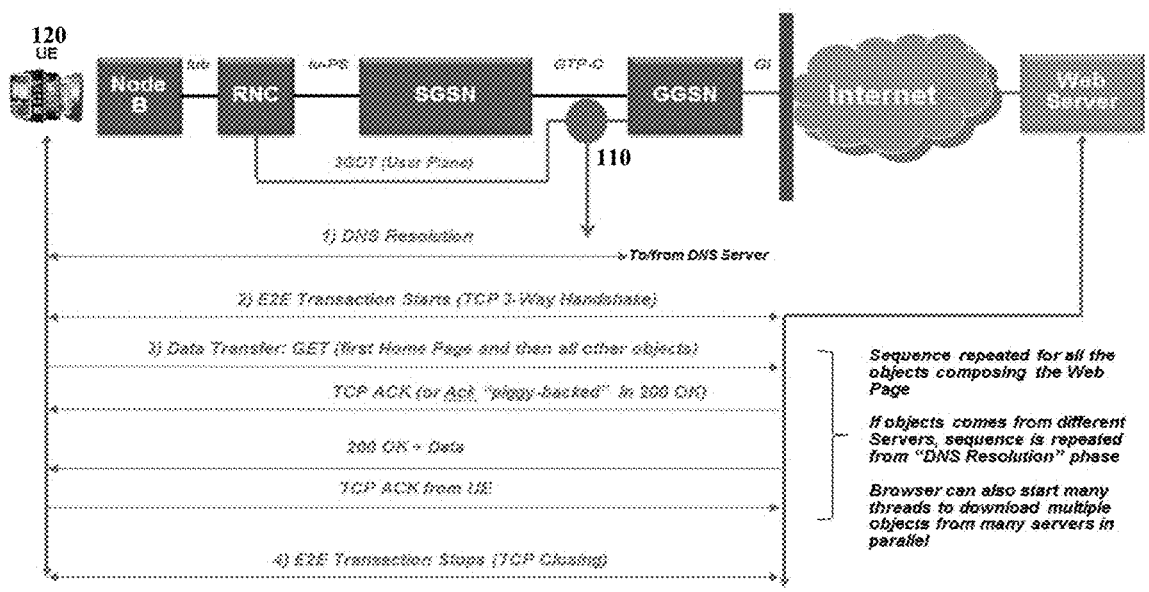
FIG. 4 depicts example probe placement on a network and sample feeds.

FIG. 4 depicts example probe 110 placement on an example network and sample feeds. Techniques described herein may interface with probes 110 (e.g., passive probes) deployed at various locations (e.g., points of observations) on the network. Probe 110 shown in FIG. 4 is placed at an example location on a network (e.g., between SGSN and GGSN network devices). Note that FIG. 4 refers to a 3G network but the same concept is applicable also to other networks (e.g., 4G networks).

The probes may periodically generate information into xDR files related to the activity of each single subscriber and covering, for example, the following procedures. (1) GTPv1 and/or GTPv2 (a pre-requisite to allow the subscriber to access the network). (2) Diameter for user authentication. (3) DNS for addresses resolutions. (4) User Plane sessions (at a minimum visibility of the HTTP transactions that are today more than 90% of the traffic, but concept can be extended to any type of specific data services, e.g., YouTube, etc.). (5) E2E transaction starts (e.g., TCP 3-way handshake) and transaction stops. (6) Data transfers.

In one embodiment, probes 110 may generate one distinct feed per procedure type containing one or more records per each detected subscriber accessing the network. These feeds may be scheduled for specific times or at various time intervals (e.g., every 5 seconds, 30 seconds, 1 minute, 5 minutes, 30 minutes, 1 hour, etc.) The format and the content of such feeds may be applicable to any feed that the Mobile Network Operator (MNO) may have already in place through existing probes, for example. The accuracy of the resulting QoE scoring will depend on the number and completeness of the available feeds. The various probes currently on the market may provide disparate type of data.

Figure 5:
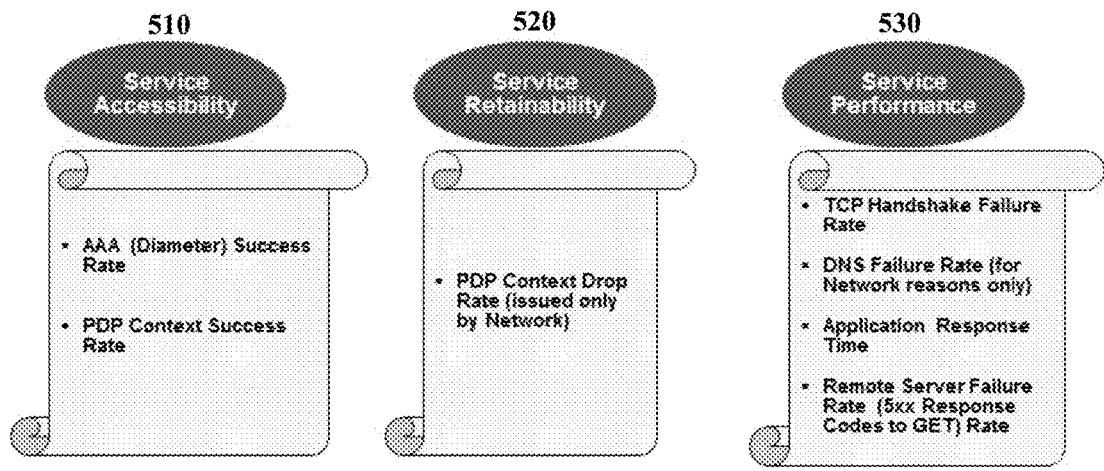
FIG. 5 depicts an example categorization of transformed metrics.

FIG. 5 depicts an example categorization of transformed metrics. In one embodiment, a set of indicators may be generated that may be used to categorize subscribers into one of three satisfaction zones, service accessibility 510, service retainability 520, and service performance 530. FIG. 5 depicts an example of KPI/KQI categorization applicable to, for example, a 3G network and specific to the service of web browsing, for example. In FIG. 5, example KPIs are listed under the example KQI's of: service accessibility 510, service retainability 520, and service performance 530. KQI may be defined by international standards and as a result may be an extensive list. Further, the techniques may be fully customized for other types of technologies (e.g., 4G) and/or services (i.e. Youtube, Facebook, Skype, etc.). KPI and KQI and the respective formulas may be fully configurable and adaptable to any networking technology. The various components of FIG. 5 may be assigned different weights depending on the value of the metric to the quality measurement and/or satisfaction zones. As example, an Authentication Success Rate equal or greater than 99% will categorize those subscribers in the satisfaction zone "Satisfied" while a value less than 95% will categorize the subscribers as "Frustrated". Note that such weights must be fully configurable.

In one embodiment, formulas may be applied to categorize each subscriber as Satisfied, Tolerating, or Frustrated within the interval time when the measurement occurs, upon the detected procedures. The formulas may account for network parameters (e.g., response codes of the various protocol procedures, response times, etc.) but also subscriber-related information (e.g., type of customer, type of contract and application accessed). This allows for formulas that may better adapt to the expectations of each subscriber. As example, a subscriber that is paying for a guaranteed bandwidth (sometime referred to "Gold" subscription) must be categorized as Frustrated if the contractual obligations in terms of speed are not met. However, a subscriber that is just paying for a "best effort" subscription (meaning that the network will try to offer the best bandwidth but without any guarantee) should be categorized as "Satisfied" if he was able to access the service although the data transfer speed was not the top one.

The formulas may be easily configured as each MNO may have its own definition about how to calculate the satisfaction levels of its subscribers, but whatever the formula will be, at this stage of the analysis, we will obtain that each subscriber has been categorized as Satisfied, Tolerating or Frustrated for each of the KQI groups (Accessibility, Retainability and Performance).

For each categorization, the number of the respective samples may also be recorded as it may be required in the final formula to obtain the QoE Index.

The following are example formulas that may be applied (note, the techniques described herein are not limited to the formulas below as the KQI groups are configurable).

Categorizing upon Service Accessibility
Diameter Success Rate (ratio between Attempts and Successful):

| | |
|---|---|
| DIAM-SR => 99% | SSZ = "S" |
| 95% <= DIAM-SR <= 98% | SSZ = "T" |
| DIAM-SR <95% | SSZ = "F" |

PDP Context Success Rate (ratio between Attempts and Successful):

| | |
|---|---|
| PDP-SR => 99% | SSZ = "S" |
| 95% <= PDP-SR <= 98% | SSZ = "T" |
| PDP-SR <95% | SSZ = "F" |

Number of Samples to count for QoE-Index formula: the number of Diameter Queries and/or PDP Create according to the computed percentage. For example: we detect 10 "PDP Create" events and the SR was 50%: we will have therefore 5 samples marked as Satisfying and 5 as Frustrated.

Categorizing upon the Service Retainability
PDP Context Drop Rate (PDP Delete issued only by Network, not by user) over the total PDP Context Created)

| | |
|---|---|
| PDP-DR <20% | SSZ = "S" |
| 20% <= PDP-DR <= 50% | SSZ = "T" |
| PDP-DR >50% | SSZ = "F" |

Number of Samples to count for QoE-Index formula: counts the samples as "S," "T," or "F" according to the computed percentage. For example: we detect 10 dropped sessions by network over a total of 20 PDP Create. PDP-SR is 50% so we count 10 samples as Satisfied and 10 as Frustrating.

Categorizing upon the Service Performances
Remote Server Accessibility Failure (TCP Handshake) Rate

| | |
|---|---|
| TCP-SFR <= 20% | SSZ = "S" |
| 20% <= TCP-SFR <= 50% | SSZ = "T" |
| TCP-SFR >50% | SSZ = "F" |

Number of Samples: we detect 8 TCP handshake failure over a total of 10 GET. TCP-SFR is 80% so SSZ="F" and samples must be 2 as Satisfied and 8 as Frustrating.

DNS Resolution Failure Rate (only for Network causes, not if user typed a wrong URL)

| | |
|---|---|
| DNS-FR <= 5% | SSZ = "S" |
| 5% <= DNS-FR <= 50% | SSZ = "T" |
| DNS-FR >50% | SSZ = "F" |

Number of Samples: we detect 8 DNS failures over a total of 10. DNS-FR is 80% so SSZ="F" and samples must be 2 as Satisfied and 8 as Frustrating.

Application Response Time:

| | |
|---|---|
| HTTP-ART <= T1 sec | SSZ = "S" |
| T1 <= HTTP-ART <= (3 * T1) sec | SSZ = "T" |
| HTTP-ART > (4 * T1) sec | SSZ = "F" |

Number of Samples: the number of HTTP transactions. For example: we detect 20 HTTP ASDR from DMS (they are the total samples): 10 are Satisfying because ART is less than 2 sec, 6 can be Tolerating and 4 can be Frustrating.

Remote Server Failure Rate (5xx Response Codes over total GET):

| HTTP-SFR <30% | do not count any sample |
|---|---|
| 30% <= HTTP-SFR <= 50% | SSZ = "T" |
| HTTP-SFR >50% | SSZ = "F" |

Number of Samples: we detect 8 5xx over a total of 10 GET. HTTP-SFR is 80% so SSZ="F" and samples must be 2 as Satisfied and 8 as Frustrating.

Figure 6:
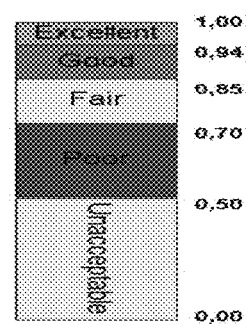
FIG. 6 depicts an example QoE Index calculation.

FIG. 6 depicts an example technique for a QoE Index calculation (e.g., overall scoring). Once the subscribers are categorized as belonging to one of the 3 Satisfaction Zones, it may be possible to build the QoE Index split by the required dimensions (e.g., Subscribers, Devices, Locations and Applications) depending on the required usage.

The quality of experience for each of the categorized subscribers is calculated and aggregated by at least one of subscribers, devices, locations, or applications. When a poor quality of experience is calculated, a possible root cause of a problem may be automatically identified. An operator may be notified if the poor quality of experience is due, for example, to issues in a user device, in an access network, in a core network or in a content provider server.

Illustrative Computer System

Figure 7:
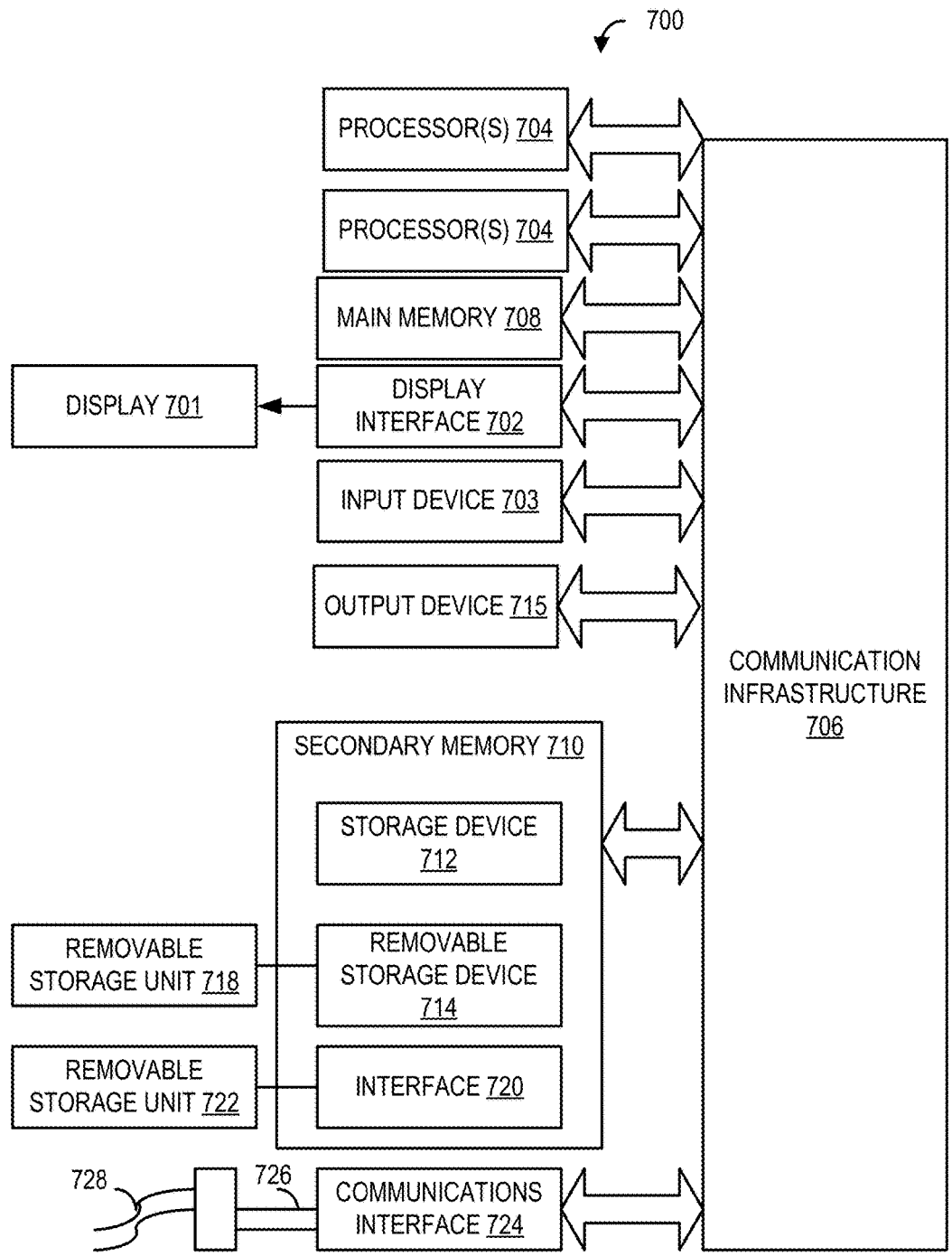
FIG. 7 depicts an example computer system that may be used in implementing an illustrative embodiment of the present invention.

FIG. 7 depicts an illustrative computer system that may be used in implementing an illustrative embodiment of the present invention. Specifically, FIG. 7 depicts an illustrative embodiment of a computer system 700 that may be used in computing devices such as, e.g., but not limited to, stand-alone or client or server devices. FIG. 7 depicts an illustrative embodiment of a computer system that may be used as client device, or a server device, etc. The present invention (or any part(s) or function(s) thereof) may be implemented using hardware, software, firmware, or a combination thereof and may be implemented in one or more computer systems or other processing systems. In fact, in one illustrative embodiment, the invention may be directed toward one or more computer systems capable of carrying out the functionality described herein. An example of a computer system 700 is shown in FIG. 7, depicting an illustrative embodiment of a block diagram of an illustrative computer system useful for implementing the present invention. Specifically, FIG. 7 illustrates an example computer 700, which in an illustrative embodiment may be, e.g., (but not limited to) a personal computer (PC) system running an operating system such as, e.g., (but not limited to) MICROSOFT® WINDOWS® NT/98/2000/XP/Vista/Windows 7/Windows 8, etc. available from MICROSOFT® Corporation of Redmond, Wash., U.S.A. or an Apple computer executing MAC® OS or iOS from Apple® of Cupertino, Calif., U.S.A. However, the invention is not limited to these platforms. Instead, the invention may be implemented on any appropriate computer system running any appropriate operating system. In one illustrative embodiment, the present invention may be implemented on a computer system operating as discussed herein. An illustrative computer system, computer 700 is shown in FIG. 7. Other components of the invention, such as, e.g., (but not limited to) a computing device, a communications device, a telephone, a personal digital assistant (PDA), an iPhone, a 3G/4G wireless device, a wireless device, a personal computer (PC), a handheld PC, a laptop computer, a smart phone, a mobile device, a netbook, a handheld device, a portable device, an interactive television device (iTV), a digital video recorder (DVR), client workstations, thin clients, thick clients, fat clients, proxy servers, network communication servers, remote access devices, client computers, server computers, peer-to-peer devices, routers, web servers, data, media, audio, video, telephony or streaming technology servers, etc., may also be implemented using a computer such as that shown in FIG. 7. In an illustrative embodiment, services may be provided on demand using, e.g., an interactive television device (iTV), a video on demand system (VOD), via a digital video recorder (DVR), and/or other on demand viewing system. Computer system 700 may be used to implement the network and components as described in FIGS. 1, 2, and/or 4. Such as probe 110, device 120 and/or central server 210.

The computer system 700 may include one or more processors, such as, e.g., but not limited to, processor(s) 704. The processor(s) 704 may be connected to a communication infrastructure 706 (e.g., but not limited to, a communications bus, cross-over bar, interconnect, or network, etc.). Processor 704 may include any type of processor, microprocessor, or processing logic that may interpret and execute instructions (e.g., for example, a field programmable gate array (FPGA)). Processor 704 may comprise a single device (e.g., for example, a single core) and/or a group of devices (e.g., multi-core). The processor 704 may include logic configured to execute computer-executable instructions configured to implement one or more embodiments. The instructions may reside in main memory 708 or secondary memory 710. Processors 704 may also include multiple independent cores, such as a dual-core processor or a multi-core processor. Processors 704 may also include one or more graphics processing units (GPU) which may be in the form of a dedicated graphics card, an integrated graphics solution, and/or a hybrid graphics solution. Various illustrative software embodiments may be described in terms of this illustrative computer system. After reading this description, it will become apparent to a person skilled in the relevant art(s) how to implement the invention using other computer systems and/or architectures.

Computer system 700 may include a display interface 702 that may forward, e.g., but not limited to, graphics, text, and other data, etc., from the communication infrastructure 706 (or from a frame buffer, etc., not shown) for display on the display unit 701. The display unit 701 may be, for example, a television, a computer monitor, or a mobile phone screen. The output may also be provided as sound through a speaker.

The computer system 700 may also include, e.g., but is not limited to, a main memory 708, random access memory (RAM), and a secondary memory 710, etc. Main memory 708, random access memory (RAM), and a secondary memory 710, etc., may be a computer-readable medium that may be configured to store instructions configured to implement one or more embodiments and may comprise a random-access memory (RAM) that may include RAM devices, such as Dynamic RAM (DRAM) devices, flash memory devices, Static RAM (SRAM) devices, etc.

The secondary memory 710 may include, for example, (but is not limited to) a hard disk drive 712 and/or a removable storage drive 714, representing a floppy diskette drive, a magnetic tape drive, an optical disk drive, a compact disk drive CD-ROM, flash memory, etc. The removable storage drive 714 may, e.g., but is not limited to, read from and/or write to a removable storage unit 718 in a well-known manner. Removable storage unit 718, also called a program storage device or a computer program product, may represent, e.g., but is not limited to, a floppy disk, magnetic tape, optical disk, compact disk, etc. which may be read from and written to removable storage drive 714. As will be appreciated, the removable storage unit 718 may include a computer usable storage medium having stored therein computer software and/or data.

In alternative illustrative embodiments, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 722 and interfaces 720, which may allow software and data to be transferred from the removable storage unit 722 to computer system 700.

Computer 700 may also include an input device 703 which may include any mechanism or combination of mechanisms that may permit information to be input into computer system 700 from, e.g., a user. Input device 703 may include logic configured to receive information for computer system 700 from, e.g. a user. Examples of input device 703 may include, e.g., but not limited to, a mouse, pen-based pointing device, or other pointing device such as a digitizer, a touch sensitive display device, and/or a keyboard or other data entry device (none of which are labeled). Other input devices 703 may include, e.g., but not limited to, a biometric input device, a video source, an audio source, a microphone, a web cam, a video camera, and/or other camera.

Computer 700 may also include output devices 715 which may include any mechanism or combination of mechanisms that may output information from computer system 700. Output device 715 may include logic configured to output information from computer system 700. Embodiments of output device 715 may include, e.g., but not limited to, display 701, and display interface 702, including displays, printers, speakers, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc. Computer 700 may include input/output (I/O) devices such as, e.g., (but not limited to) input device 703, communications interface 724, cable 728 and communications path 726, etc. These devices may include, e.g., but are not limited to, a network interface card, and/or modems.

Communications interface 724 may allow software and data to be transferred between computer system 700 and external devices.

In this document, the terms "computer program medium" and "computer readable medium" may be used to generally refer to media such as, e.g., but not limited to, removable storage drive 714, a hard disk installed in hard disk drive 712, flash memories, removable discs, non-removable discs, etc. In addition, it should be noted that various electromagnetic radiation, such as wireless communication, electrical communication carried over an electrically conductive wire (e.g., but not limited to twisted pair, CAT5, etc.) or an optical medium (e.g., but not limited to, optical fiber) and the like may be encoded to carry computer-executable instructions and/or computer data that embodiments of the invention on e.g., a communication network. These computer program products may provide software to computer system 700. It should be noted that a computer-readable medium that comprises computer-executable instructions for execution in a processor may be configured to store various embodiments of the present invention. References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic.

Further, repeated use of the phrase "in one embodiment," or "in an illustrative embodiment," do not necessarily refer to the same embodiment, although they may. The various embodiments described herein may be combined and/or features of the embodiments may be combined to form new embodiments.

Unless specifically stated otherwise, as apparent from the following discussions, it is appreciated that throughout the specification discussions utilizing terms such as "processing," "computing," "calculating, " "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments may be embodied in many different ways as a software component. For example, it may be a stand-alone software package, or it may be a software package incorporated as a "tool" in a larger software product, such as, for example, a scientific modeling product. It may be downloadable from a network, for example, a website, as a stand-alone product or as an add-in package for installation in an existing software application. It may also be available as a client-server software application, or as a web-enabled software application. It may also be part of a system for detecting network coverage and responsiveness. Computer system 700 may be used to create a general purpose computer. A general purpose computer may be specialized by storing programming logic that enables one or more processors to perform the techniques indicated herein and the steps of, for example, FIG. 3. Computer system 700 or multiple embodiments of computer system 700 may be used to perform the functions of, for example, central server 210.

Embodiments of the present invention may include apparatuses for performing the operations herein. An apparatus may be specially constructed for the desired purposes, or it may comprise a general purpose device selectively activated or reconfigured by a program stored in the device.

Embodiments may be embodied in many different ways as a software component. For example, it may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application.

While various embodiments of the present invention have been described above, it should be understood that they have been presented by way of example only, and not limitation. Thus, the breadth and scope of the present invention should not be limited by any of the above-described illustrative embodiments, but should instead be defined only in accordance with the following claims and their equivalents. The embodiments of the present invention that have been described above may contain features that may be removed or combined between the described embodiments to derive additional embodiments.

What is claimed is:

1. A system for scoring an experience of accessed services comprising:
   a probe, the probe connected to a telecommunications network, the probe configured to transmit metrics at regular intervals; and
   a network monitor comprising one or more processors, the network monitor configured to:
      receive data from the probe;
      transform the data into key performance indicators;
      generate a set of key quality indicators based on the key performance indicators;
      categorize one or more subscribers as one of: satisfied, tolerating, or frustrated, based on the set of key quality indicators, to yield categorized subscribers;
      calculate a Quality of Experience index based on the categorized subscribers;
      aggregate the Quality of Experience Index by at least one of subscribers, devices, locations, or applications, to yield an aggregated Quality of Experience;
      identify the aggregated Quality of Experience as a poor experience;
      indicate that a possible root cause of the poor experience is due to at least one of issues in a user device, in an access network, in a core network, or in a content provider server.

2. The system of claim 1, wherein the probe is passive.

3. The system of claim 1, wherein the probe transmits data at one minute intervals.

4. The system of claim 1, wherein the probe generates a data feed for each procedure type.

5. The system of claim 4, wherein the procedure type includes: GTPv1, GTPv2, Diameter user authentication, DNS for address resolutions, and user plane sessions.

6. The system of claim 1, wherein the probe generates one or more records for each detected subscriber accessing the telecommunications network.

7. The system of claim 1, wherein the set of key quality indicators includes indicators in one or more performance zones: service accessibility, service retainability, and service performance.

8. The system of claim 7, wherein the one or more performance zones include service accessibility, service retainability, and service performance.

9. A method for scoring an experience of accessed services, the method comprising:
   receiving, by a network monitor, data from one or more network probes, the one or more network probes located on a telecommunications network;
   transforming, by the network monitor, the data received from the one or more network probes into key performance indicators;
   generating, by the network monitor, a set of key quality indicators based on the key performance indicators;
   categorizing, by the network monitor, one or more subscribers of the accessed services as one of: satisfied, tolerating, or frustrated, based on the set of key quality indicators, to yield categorized subscribers; and
   calculating a quality of experience for each of the categorized subscribers, to yield calculated quality of experiences;
   aggregating the calculated quality of experiences by at least one of subscribers, devices, locations, or applications, to yield an aggregated quality of experience measurement;
   identifying the aggregated quality of experience measurement as a poor experience;
   indicating that a possible root cause of the poor experience is due to at least one of issues in a user device, in an access network, in a core network, or in a content provider server.

10. The method of claim 9, wherein the one or more network probes are passive.

11. The method of claim 9, wherein the one or more network probes transmit data at one minute intervals.

12. The method of claim 9, wherein the one or more network probes generate one data feed per procedure type.

13. The method of claim 12, wherein the procedure type includes: GTPv1, GTPv2, diameter user authentication, DNS for address resolutions, and user plane sessions.

14. The method of claim 9, wherein the one or more network probes generate one or more records for each detected subscriber accessing the telecommunications network.

15. The method of claim 9, wherein the set of key quality indicators include indicators in one or more performance zones.

16. The method of claim 15, wherein the one or more performance zones include service accessibility, service retainability, and service performance.

* * * * *